United States Patent [19]
Baker

[11] 3,913,440
[45] Oct. 21, 1975

[54] GUIDE DEVICE FOR POWER SAW AND THE LIKE

[76] Inventor: Richard D. Baker, 3376 McLaughlin Ave., Los Angeles, Calif. 90066

[22] Filed: Nov. 29, 1974

[21] Appl. No.: 528,452

[52] U.S. Cl. .................. 83/745; 83/460; 83/465; 83/700; 33/80
[51] Int. Cl.² ........................................ B23D 51/02
[58] Field of Search...... 83/745, 744, 743, 698–700, 83/465, 460; 269/275, 48.1; 33/80; 279/1 Q

[56] References Cited
UNITED STATES PATENTS

| | | | |
|---|---|---|---|
| 914,743 | 3/1909 | McDonald | 269/48.1 |
| 2,326,301 | 8/1943 | Leffel | 33/80 |
| 2,450,230 | 9/1948 | Bush | 279/1 Q |
| 2,708,465 | 5/1955 | Huebner et al. | 83/745 |

*Primary Examiner*—J. M. Meister
*Attorney, Agent, or Firm*—Edward A. Sokolski

[57] ABSTRACT

A guide device for guiding a power hand tool such as a saber saw, circular saw, router, etc., includes a slotted guide bar or fence member to which a cross bar alignment member is attached. An adjustable clamp member is slidably mounted in the guide bar slot and includes an adjustment knob which operates to axially compress and cause radial expansion of a resilient post member. The guide device is clamped to the workpiece with opposite edges of such workpiece clamped between the cross bar member and the resilient post, the guide bar providing a straight edge for guiding the tool as it moves across the workpiece.

10 Claims, 8 Drawing Figures

U.S. Patent Oct. 21, 1975 Sheet 1 of 2 3,913,440
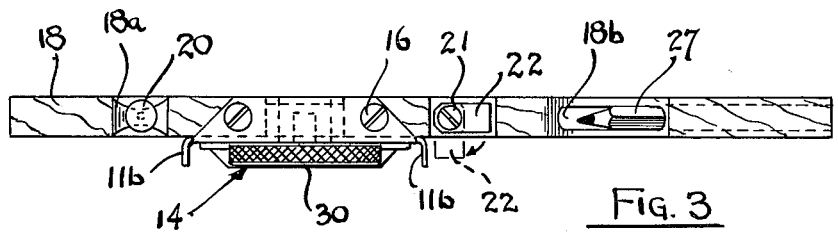
FIG. 3
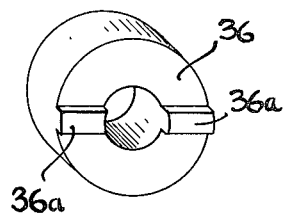
FIG. 5
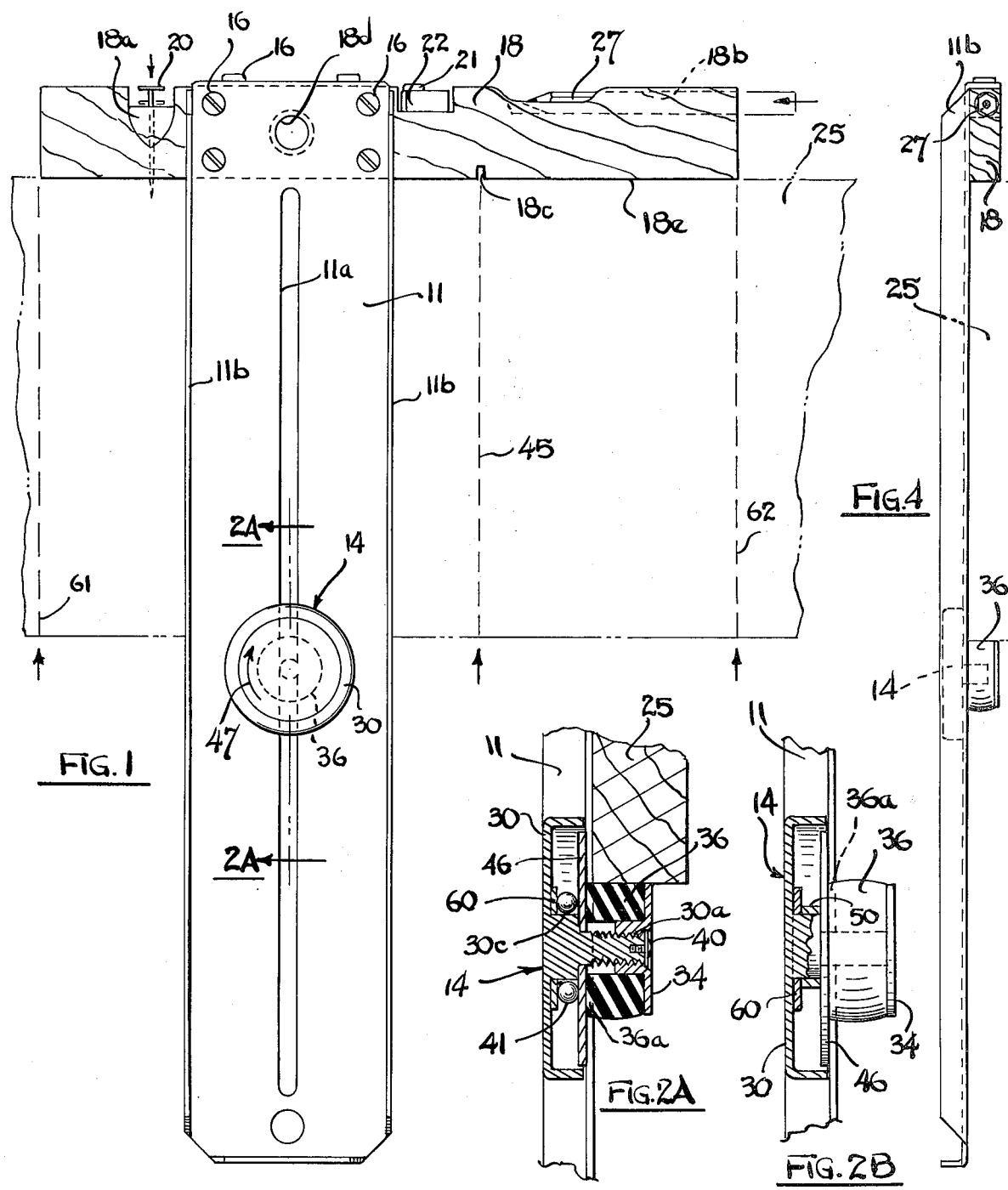
FIG. 1
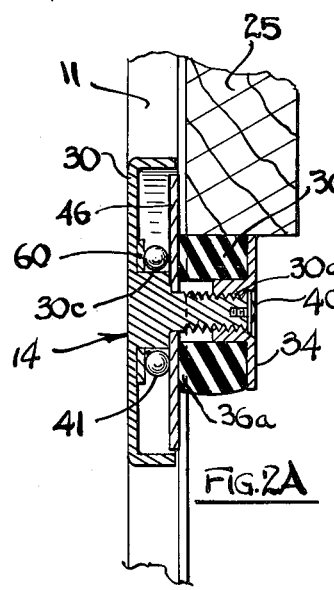
FIG. 2A
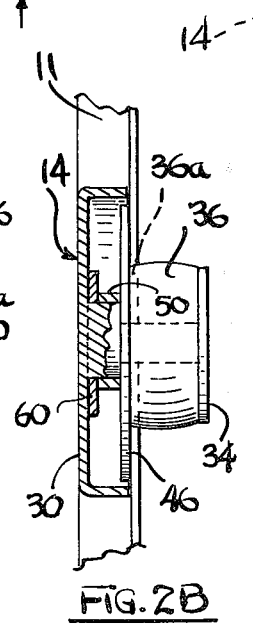
FIG. 2B
FIG. 4

GUIDE DEVICE FOR POWER SAW AND THE LIKE

This invention relates to guides for use with power tools and more particularly to such a device which clamps to the workpiece and provides a guide edge for use in guiding the travel of a tool over the workpiece.

In the use of hand power tools, such as sabre and circular saws, routers, and the like, it is often helpful, particularly for an inexperienced operator, to utilize a guide device which guides the travel of the tool over the workpiece. Various devices have been developed to accomplish this end result. Some involve attachments which are connected directly to the power tool, and which run along an edge of the workpiece. This type of device is somewhat limited in its utilization in that it generally can only be used where the operation involved is being performed relatively close to the edge along which the guide member runs. Further, most of these types of prior art guide devices fail to provide a stable guide edge, such that they are difficult to be effectively used by inexperienced operators.

Other types of prior art tool guide devices are described in U.S. Pat. No. 2,942,633 to King, and U.S. Pat. No. 2,708,465 to Huebner. Both of these patents described guide devices utilizing guide bars which are clamped to opposite edges of the workpiece. While these prior art devices appear to be capable of providing firmly retained guide bars, they are overly complicated and expensive in their construction and are somewhat more difficult to set in position than the present invention in that they require the adjustment of two separate clamping members.

The device of the present invention provides an improvement over prior art devices in its simplicity and economy of construction. The device of the invention further is capable of being rapidly and easily set in position, even by an inexperienced operator, to provide a firmly retained guide edge.

It is therefore an object of this invention to provide an improved power tool guide device which is simple to operate and more economical in construction than prior art devices.

It is a further object of this invention to provide a power tool guide device which can be firmly set in position on a workpiece with the exercise of a minimum amount of effort and skill.

Other objects of the invention will become apparent as the description proceeds in connection with the accompanying drawings, of which:

FIG. 1 is a top plan view of a preferred embodiment of the invention;

FIG. 2A is a cross-sectional view taken along the plane indicated by 2A—2A in FIG. 1;

FIG. 2B is a cross-sectional view of an alternative construction for the locking member of the preferred embodiment;

FIG. 3 is an elevational end view of the preferred embodiment;

FIG. 4 is an elevational side view of the preferred embodiment;

FIG. 5 is a perspective view of the resilient friction lock member of the preferred embodiment;

Figure 6:
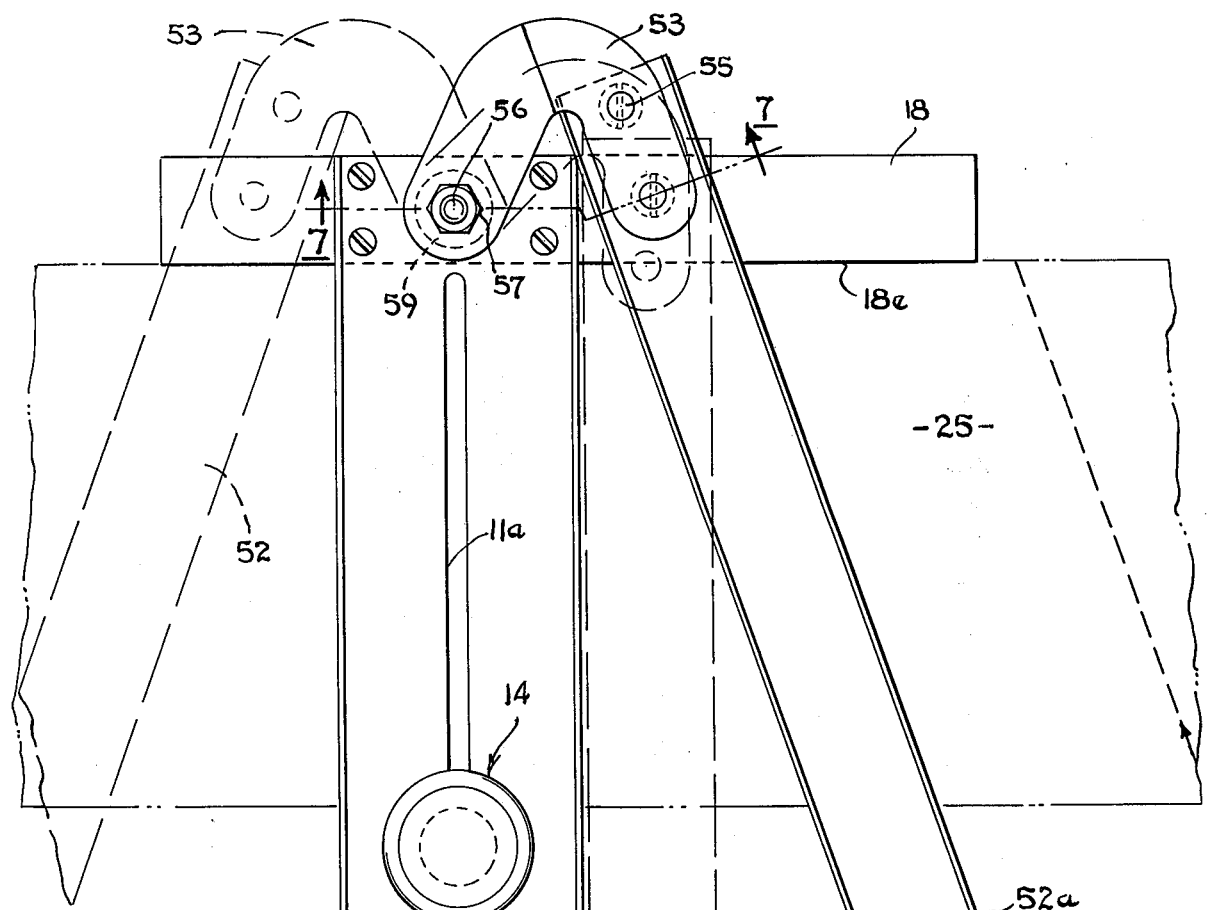
FIG. 6 is a top plan view illustrating an angle cutting attachment which may be utilized in the device of the invention.

Briefly described, the device of the invention is as follows: A guide bar has a longitudinal slot formed therein in which an adjustable clamp member is slidably mounted. A cross bar member which forms means for aligning the guide bar along the workpiece is attached to the guide bar at one end thereof. The clamp member includes resilient post means which can be clamped to the guide bar in abutment against an edge of the workpiece to retain the guide device on the workpiece with such workpiece being clamped between the cross bar and the clamp member.

Referring now to FIGS. 1–5, a preferred embodiment of the invention is illustrated. Guide bar 11 has an elongated longitudinal slot 11a formed therein. Mounted in slot 11a for adjustment therealong is clamp member 14. Guide bar or fence member 11 has a pair of flanges 11b along the edges thereof. Attached to guide bar 11 at one end thereof by means of screws 16 is alignment cross bar 18, this cross bar being oriented at right angles to the longitudinal axis of guide bar 11. Mounted in an aperture formed in cross bar 18 is tack or pin member 20, this tack being tacked to workpiece 25 as shown in FIG. 1 for more firmly holding the guide to the workpiece. A groove 18a is provided in cross bar 18 to facilitate the manipulation of pin 20. Pivotally mounted on cross bar 18 by means of screw 21 is stop finger 22 which may be manually rotated upwardly as shown in FIG. 3 so that the foot of a tool such as a saber saw abuts thereagainst at the end of its travel, thereby limiting the travel of such tool to prevent damage to cross bar 18. Further, cross bar 18 has a receptacle 18b formed therein for receiving a pencil 27.

Clamp member 14 comprises knurled knob 30 which has a threaded stud portion 30a which extends therefrom. Threaded portion 30a threadably engages flange nut 34 forming a retainer which is press fitted into resilient cylindrical post member 36, fabricated of a resilient material such as rubber. Member 36 has a pair of raised portions 36a which fit into slot 11a and prevent rotation of this member relative to guide bar 11 when knob 30 is rotated. Insert 34 and post member 36 are retained on knob 30 by means of retainer screw 40 which threadably engages the end of stud 30a, this screw permitting limited relative rotational and axial movement between knob 30 and post member 36. A cylindrical shoulder portion 30c is formed on knob 30 between threaded stud portion 30a and the inner face of knob 30, a ball bearing assembly 41 being mounted on this shoulder portion. A thrust washer 46 is positioned between bearing assembly 41 and guide bar 11 and raised portion 36a of the post member. Thrust washer 60 is placed between the inner face of knob 30 and the ball bearing assembly 41.

Before first use of the device with a saber saw, a notch 18c is first preferably cut in cross bar 18 with the saw, the side of the saw being held against guide rail 11b, the blade of the saw being displaced from this rail as indicated by dotted line 45. Then in subsequent uses of the saw, notch 18c may be used in aligning the guide on the workpiece for making a cut, for example, along a line indicated in FIG. 1 by 45. Also, the saw will now be permitted to cut completely through the workpiece 25, the saw blade entering notch 18c, with forward travel being finally stopped by stop finger 22.

Operation of the device is as follows: Guide bar 11 is first aligned in the proper position along workpiece 25 for making a desired cut (e.g., along line 45), with inner edge 18e of cross bar 18 abutting against an upper edge of the workpiece and with clamp member 14 loosened and positioned in slot 11a below the lower edge of the workpiece. Clamp member 14 is then brought into abutment against the lower edge of workpiece 25, as shown in the FIGS. Knob 30 is then rotated clockwise as indicated by arrow 47, which draws flange nut 34 toward the knob and cause resilient post member 36 to be compressed between guide bar 11 and the inner wall of flange nut 34. Such compression of resilient post member 36 causes it to expand radially and to abut in clamping engagement against the edge of the workpiece, thereby causing the guide device to be clamped thereto. The guide device may be further retained to the workpiece by means of pin member 20 which is pressed into the workpiece as shown in FIG. 1. The saw can then be used to cut through the workpiece as indicated by dotted line 45, the edge of the saw being guided along flange 11b. At the end of its travel, the blade of the saw enters notch 18c, further forward travel of the saw being stopped by stop finger 22 (shown in its withdrawn position in the drawings).

When the device of the invention is utilized with a circular power saw, the ends of cross bar 18 can first be "custom" cut with the saw to form guides for properly aligning the device on a workpiece. This can be done by first placing the saw with its left edge against the right hand flange 11b of the guide bar and cutting through the cross bar (and a workpiece if desired) as indicated by dotted line 62. Similarly, a cut is made through the cross bar as indicated by dotted line 61 with the right edge of the saw against the left hand flange 11b. The left and right edges of cross bar 18 will then provide alignment edges for aligning the device on a workpiece.

Referring now to FIG. 2B, an alternate configuration for the clamp member is illustrated. This configuration is the same as the first, except that in lieu of a ball bearing for facilitating rotational movement between knob 30 and thrust washer 46, rather a sleeve bearing 50 is utilized. This sleeve bearing while not having as low friction as the ball bearing, affords greater economy of construction.

Figure 7:
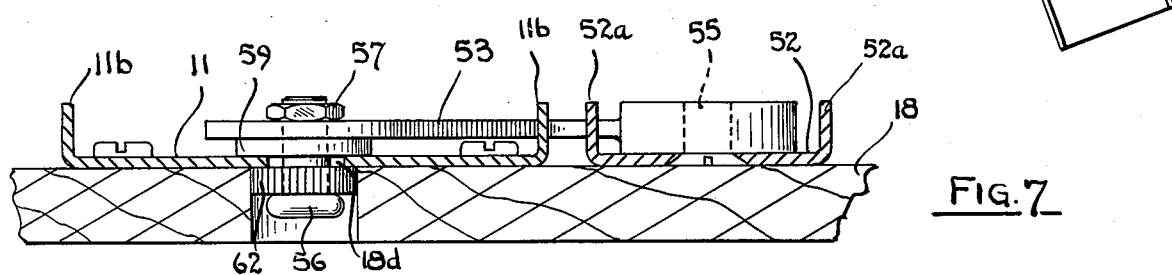
FIG. 7 is a cross-sectional view taken along the plane indicated by 7—7 in FIG. 6.

Referring now to FIGS. 6 and 7, an attachment member which may be utilized in the device of the invention for making angle cuts is illustrated. Guide bar 52 having edge flanges 52a is fixedly attached to U-shaped bracket 53 by means of screws 55. An end of bracket 53 is bolted to guide bar 11 by means of bolt 56 and nut 57, the bolt being fitted through aperture 18d (see FIG. 1) of the guide bar, there being a slide washer 59 between the bracket and guide bar and a knurled washer 62 between the head of bolt 56 and the inner surface of guide bar 11. Guide bar 52 may be locked in position on the guide bar by means of bolt 56 and nut 57 to provide a guide for making a desired angle cut, the entire unit being clamped to the workpiece by means of clamp member 14 as described previously. Thus, a guide is provided for making angular cuts. Guide bar 52 can also be positioned on the guide bar as indicated by the dotted illustrations thereof, i.e., to the left of guide bar 11, merely by flipping bracket 53 over to its opposite side and attaching it to guide bar 11 with bolt 56 and nut 57, as shown by the dotted illustration.

The device of the invention thus provides a simple ecomonical means for guiding the operation of power tools such as saws, routers, and the like. The device is simple to operate, utilizing a single adjustment knob for firmly retaining the guide on the workpiece.

While the invention has been described and illustrated in detail, it is to be clearly understood that this is intended by way of illustration and example only and is not to be taken by way of limitation, the spirit and scope of the invention being limited only the terms of the following claims.

I claim:

1. A guide device for guiding a power tool along a workpiece comprising:

a guide bar having a longitudinal slot formed therein and at least one edge for guiding the tool along the workpiece, a cross bar member attached to the guide bar, and an adjustable clamp member supported on said guide bar in the longitudinal slot thereof for clamping the guide device to the workpiece, said clamp member including resilient post means and means for compressing said post means against said guide bar, thereby clamping said clamp member to said guide bar and causing said post means to expand radially in abutment against the workpiece, the workpiece being clamped between said cross bar member and said clamp member with opposite edges of said workpiece in clamped abutment against said cross bar member and said post means respectively.

2. The guide device of claim 1 wherein said post means comprises a cylindrical member having raised portions formed therein, said raised portions being fitted into the guide bar slot, thereby to prevent rotation of said post means relative to the guide bar.

3. The device of claim 1 wherein the means for compressing said post means comprises a knob having a broad surfaced portion positioned opposite one surface of said guide bar and a threaded stud portion placed in the guide bar slot and a threaded flange nut fitted in said resilient post means and positioned along the surface of said guide bar opposite said one surface thereof, the stud portion of the knob threadably engaging said flange nut.

4. The device of claim 3 and further including a thrust washer positioned between the broad surfaced knob portion and the guide bar along said one surface of said guide bar and a ball bearing assembly positioned between the thrust washer and the broad surfaced knob portion.

5. The device of claim 3 and further including a thrust washer positioned between the broad surfaced knob portion and the guide bar along said one surface of said guide bar and a sleeve bearing positioned between the thrust washer and broad surfaced knob portion.

6. The device of claim 1 and further including tack means for tacking the cross bar to the workpiece, said cross bar having an aperture extending therethrough, said tack means being fitted in said aperture.

7. The device of claim 5 and further including a retainer screw for securing said flange nut to the knob stud portion permitting limited relative axial motion between the flange nut and the knob.

8. The device of claim 1 and further including stop finger means pivotally mounted on said cross bar member for limiting the forward travel of the tool.

9. The device of claim 1 and further including means attached to said device for guiding said tool to make angle cuts, said last mentioned means comprising a second guide bar and a U-shaped bracket for removably attaching said second guide bar to the first guide bar, one end of said bracket being attached to said second guide bar, the other end of said bracket being attached to the first guide bar.

10. The device of claim 9 wherein said bracket is fixedly attached to said second guide bar and attached to said first guide bar for pivotal adjustment relative thereto whereby said second guide bar is adapted for adjustment to a selected angle relative to the first guide bar.

* * * * *